(12) United States Patent
Capitan

(10) Patent No.: US 12,741,508 B2
(45) Date of Patent: Sep. 22, 2026

(54) THERMAL EXPANSION TANK HAVING AN EXPANSION MEMBER FOR USE IN A DIELECTRIC FLUID COOLING CIRCUIT

(71) Applicant: FCA US LLC, Auburn Hills, MI (US)

(72) Inventor: Christopher Capitan, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 106 days.

(21) Appl. No.: 18/978,485

(22) Filed: Dec. 12, 2024

(65) Prior Publication Data

US 2026/0166961 A1 Jun. 18, 2026

(51) Int. Cl.

| | |
|---|---|
| ***B60H 1/32*** | (2006.01) |
| ***B60K 1/00*** | (2006.01) |
| ***B60K 11/02*** | (2006.01) |
| ***B60L 58/26*** | (2019.01) |

(52) U.S. Cl.

CPC ................ *B60H 1/32* (2013.01); *B60K 11/02* (2013.01); *B60L 58/26* (2019.02); *B60H 2001/3297* (2013.01); *B60K 2001/006* (2013.01)

(58) Field of Classification Search

CPC .. B60H 1/32; B60H 2001/3297; B60K 11/02; B60K 2001/006; B60K 2001/003; B60L 58/26

See application file for complete search history.

(56) References Cited

U.S. PATENT DOCUMENTS

| | | | | |
|---|---|---|---|---|
| 6,193,479 | B1 * | 2/2001 | Angoli | F04D 13/16 417/423.15 |
| 8,397,681 | B2 * | 3/2013 | Popadiuc | F01P 11/029 165/83 |
| 9,738,138 | B2 * | 8/2017 | Rebinger | B60H 1/00885 |
| 2019/0383203 | A1 * | 12/2019 | Di Martino | F01P 7/14 |
| 2024/0059139 | A1 * | 2/2024 | Oechslen | B60K 11/02 |
| 2024/0399853 | A1 * | 12/2024 | Capitan | B60K 1/00 |

* cited by examiner

*Primary Examiner* — Lionel Nouketcha
(74) *Attorney, Agent, or Firm* — Jeremy J. Klobucar

(57) ABSTRACT

A cooling system for an electrified vehicle powertrain includes a cooling circuit fluidly coupling at least a traction battery, an electric motor, a pump, a heat exchange device and an expansion and contraction tank. The tank provides a sealed volume in the circuit for thermal expansion and contraction of the dielectric fluid as the temperature of the dielectric fluid increases or decreases. The tank includes an elastic member bifurcating an interior volume of the tank and separating the dielectric fluid on one side of the bladder from a volume of air functioning as a fluid spring on the other side of the bladder. The gas is configured to compress with the thermal expansion of the dielectric fluid.

13 Claims, 2 Drawing Sheets

THERMAL EXPANSION TANK HAVING AN EXPANSION MEMBER FOR USE IN A DIELECTRIC FLUID COOLING CIRCUIT

FIELD

The present application generally relates to a cooling circuit for electrified drive systems of electric vehicles and, more particularly, to a thermal expansion tank with an expansion member for use in a dielectric cooling circuit, such as for an electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicle traction batteries can be cooled using air cooling or liquid cooling. Liquid cooling is emerging as the preferred active cooling method to cool today's traction batteries. Conventional liquid cooling utilizes an ethylene glycol/water mixture to cool the traction batteries, similar to or the same as for a cooling system of an internal combustion engine. This ethylene glycol/water mixture cannot come into direct contact with the battery cells and is therefore circulated through passages, tubes or cold plates that surround the battery cells of the traction battery to carry heat away from the battery cells to cool the cells. This is an indirect cooling method because the components that carry the ethylene glycol/water mixture prevent direct electrical contact between the cells and this liquid coolant. While this cooling method is effective and used in today's electric vehicles, there are cooling inefficiencies due to loss of heat transfer because the cooling method is indirect. One possible alternative being investigated is use of dielectric fluid. However, dielectric fluids age rapidly when exposed to atmospheric air and water vapor which will make the dielectric fluid, which is costly, essentially unusable. Environmental air contains reactive oxygen and is saturated with water vapor that condenses on any exposed cold oil surface and absorbed into the lower density dielectric fluid oil. Thus, there remains a desire for improved cooling performance of components, such as traction batteries, in a cooling circuit for an electric vehicle using dielectric fluid.

SUMMARY

According to one example aspect of the invention, an electric vehicle cooling system using a dielectric cooling fluid is provided. In one exemplary implementation, the electric vehicle cooling system includes: a cooling circuit fluidly coupling a traction battery, an electric motor and optionally an inverter, a fluid pump, a heat exchange device and an expansion and contraction tank. The cooling circuit is a closed circuit sealed from the atmosphere and substantially free of atmospheric air; with the pump circulating the dielectric fluid through the cooling circuit for cooling the traction battery, electric motor and optionally the inverter. The expansion and contraction tank is configured to provide a sealed pressure volume in the cooling circuit to allow for thermal expansion and contraction of the dielectric fluid as the temperature of the dielectric fluid increases with increasing temperature of one or more of the traction battery, electric motor and inverter. The expansion and contraction tank includes an expansion member bifurcating an internal volume of the tank into a first portion on one side of the expansion member in communication with the dielectric fluid, and second portion on an opposite side of the expansion member, where the expansion member provides a seal between the first and second portions. The second portion comprises a gas that is configured to compress within the second portion of the tank with the thermal expansion of the dielectric fluid in the first portion.

In some implementations, the expansion and contraction tank includes an outer housing forming the internal volume with the first volume portion being sealed from the atmosphere, and the internal volume comprises only the first and second portions.

In some implementations, the gas in the second portion is substantially at atmospheric pressure when the dielectric fluid is at atmospheric temperature. In some implementations, the gas in the second portion is atmospheric air.

In some implementations, the gas in the second portion performs a spring function reacting against the thermal expansion of the dielectric fluid in the first portion as the temperature of the dielectric fluid increases.

In some implementations, the expansion member comprises an elastic bladder or membrane sealing the first portion from the second portion of the expansion tank.

In some implementations, the outer housing includes a hydrophobic breather cap in fluid communication with only the second portion of the internal volume.

In some implementations, the outer housing is a rigid housing. In some implementations, the outer housing is a two-piece housing having first and second housing body portions, and a flange for sealingly connecting the first and second housing body portions to form the internal volume. In some implementations, the expansion and contraction tank is a standalone tank separate and distinct from the battery pack.

In some implementations, the expansion member is coupled to the flange. In some implementations, the expansion member comprises an elastic bladder. In some implementations, the expansion member is configured to expand under pressure so as to provide an additional 2.0 liters of volume to the first portion of the internal volume of the tank.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DETAILED DESCRIPTION

Figure 1:
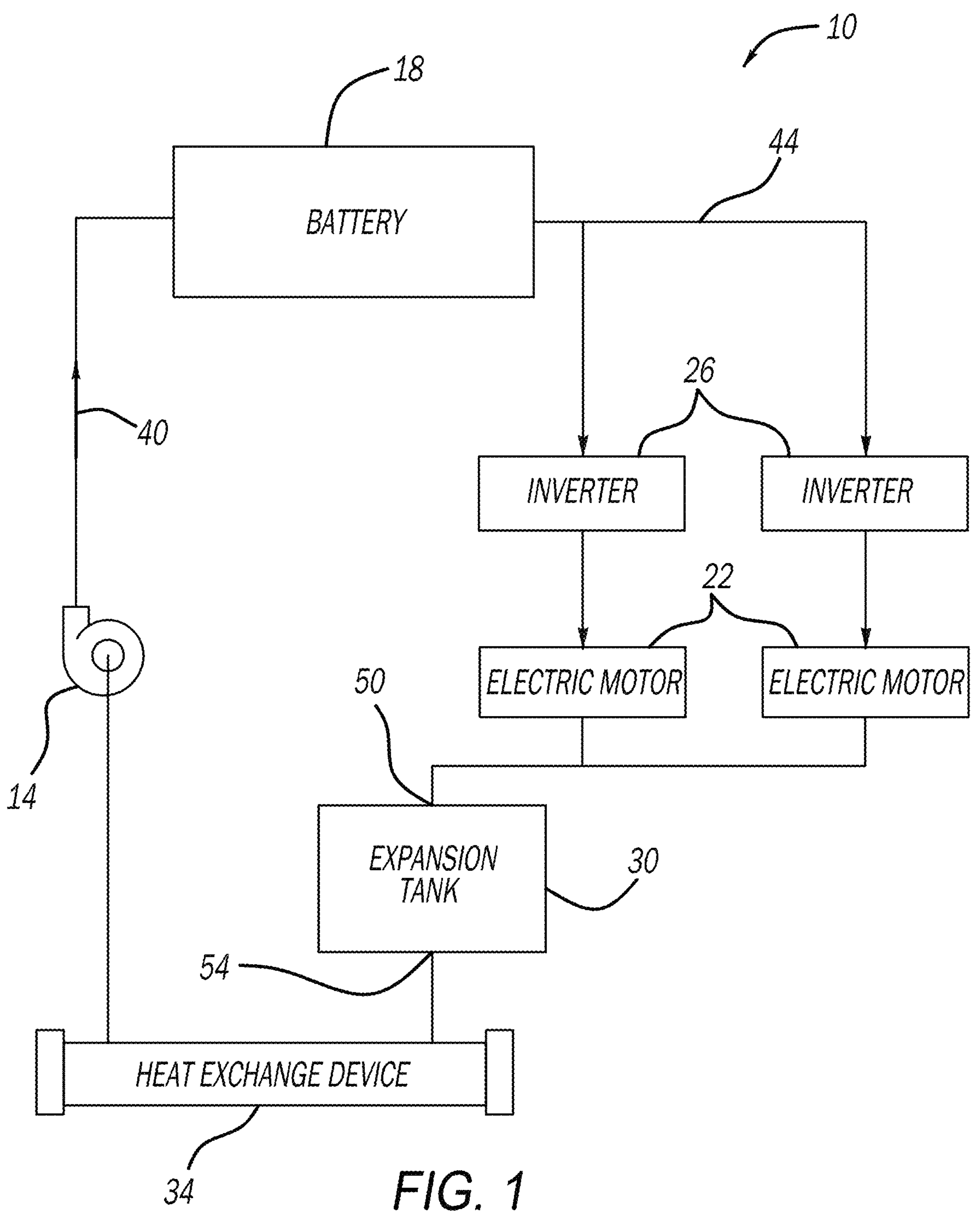
FIG. 1 is a high level schematic illustration of an example electric vehicle cooling circuit for use with dielectric fluid and a dielectric fluid expansion and contraction tank having an elastic member according to the principles of the present application.

As previously discussed, electric vehicle cooling circuits conventionally use an ethylene glycol/water mixture for cooling and this requires an indirect cooling method for the battery cells because this liquid coolant cannot come into direct electrical contact with the cells. This indirect cooling method is utilized on today's electric vehicles and does work for its intended purpose, but also results in heat exchange losses due to the indirect heat exchange contact between the cells and the liquid coolant. Improved cooling of the battery would allow the battery to operate more efficiently and often provide more power because the temperature of the battery would be better regulated with such improved cooling.

Accordingly, an improved cooling circuit for an electric vehicle is provided and discussed herein. In one example implementation, the improved cooling circuit utilizes a dielectric fluid designed and configured to come into direct contact with battery cells of the traction battery. This provides a direct cooling method with improved thermal heat exchange between the battery cells and the dielectric fluid due to the fluid coming into direct contact with the heat source.

One drawback of dielectric fluid besides its notable cost increase as compared to the ethylene glycol/water mixture, is its greater thermal expansion. Another drawback of the dielectric fluid is its incompatibility with atmospheric air. Dielectric fluids, such as dielectric cooling oils, age rapidly when exposed to atmospheric air and/or water vapor, which will thus render these expensive cooling fluids essentially unusable. Conventional thermal expansion bottles for ethylene glycol/water mixture cooling systems are not environmentally sealed from the atmosphere, sometimes even when capped, and others breathe to the atmosphere.

Accordingly, the improved cooling circuit using dielectric fluid presented herein further includes an expansion tank having at least a portion thereof environmentally sealed from the atmosphere and designed to compensate for the greater thermal expansion of the dielectric fluid. Further, in addition to the expansion tank being environmentally sealed, the tank also includes an expansion member or bladder bifurcating an internal volume of the tank and configured to provide a flexible seal separating dielectric fluid within the tank on one side of the bladder from fluid forming an air spring on the other side of the flexible bladder. One advantage of this arrangement is that the fluid forming the air spring does not need to be an inert gas and, in one example, can be atmospheric air. The elastic bladder and associated air chamber provides pressure balance to the cooling circuit in the form of the gas spring.

It will be appreciated that while example disclosure will continue with reference to the expansion tank being associated with a battery pack of a cooling circuit of a cooling system of an electric vehicle, the expansion tank is also contemplated for use outside of transportation and for cooling components other than a battery or battery pack. In addition, for clarity of the disclosure, the discussion will continue largely with reference to the expansion and contraction tank as being an "expansion tank" or simple a "tank". It will be also appreciated that the shape of the expansion tank can take various forms depending on its actual placement in the cooling circuit and/or constraints of the surrounding vehicle environment and/or components.

Turning now to the drawings, FIG. 1 shows at reference numeral 10 a high level schematic illustration of an improved dielectric cooling circuit for an electric vehicle. In the example implementation illustrated, the cooling circuit 10 includes a fluid pump 14, a traction battery pack 18, one or more electric motors 22 and associated inverters 26, an expansion chamber, volume or tank 30 and a heat exchange device 34, such as a radiator. The cooling circuit 10 is a closed or substantially closed circuit and sealed from the atmosphere, where the fluid pump 14 circulates dielectric fluid 40 through conduits or passages or tubing or pathways 44 connecting the above-identified components and forming part of the cooling circuit 10. The cooling circuit 10 can be associated with an electrified powertrain of the electrified vehicle.

It will be appreciated that the cooling circuit 10 is shown in simplistic schematic form eliminating other components known to the skilled artisan for clarity of discussion. It will also be appreciated that the order and placement of the components of cooling circuit 10 are schematically shown for illustration and discussion purposes only and may not represent the actual order and placement of such components in the electric vehicle.

With additional reference to FIG. 2 and continuing reference to FIG. 1, the expansion tank 30 will now be discussed in greater detail. In one example implementation, the expansion tank 30 is in the form of a tank having an inlet 50 and an outlet 54 for the flow of dielectric fluid 40 therethrough, as may be needed depending on the cooling needs of the battery pack 18 and the thermal expansion of the dielectric fluid 40 during operation of the electric vehicle and associated load placed on the battery pack 18. The expansion tank 30 also includes an outer housing 58, an inlet 62 for supply of the dielectric fluid 40, and an optional breather cap 70 for venting of moisture/condensation associated with a gas 66 in a portion of expansion tank 30. In one example implementation, the outer housing 58 is a rigid housing that forms an internal volume 74.

Figure 2:
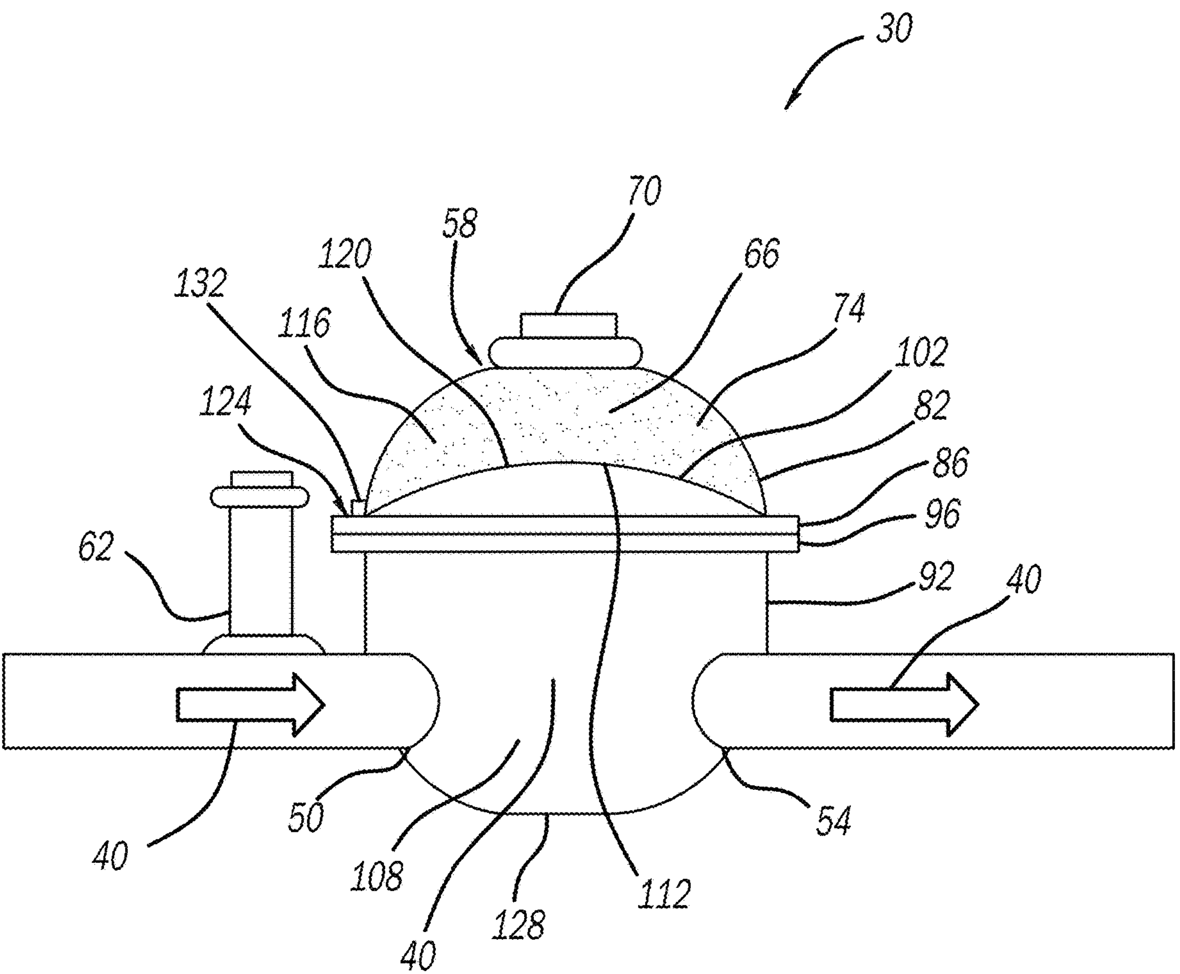
FIG. 2 is a high level schematic illustration of the expansion tank having an expansion chamber including the expansion member according to the principles of the present application.

In the example expansion tank 30 illustrated in FIG. 2, the tank 30 can be in the form of a two-piece tank 30 where the rigid outer housing 58 includes a first housing body portion 82 having a first flange member 86, and a second housing body portion 92 having a second flange member 96. As can be seen in FIG. 2, the first and second flange member can be coupled together, such as by fasteners, to form the tank 30 with the inner or internal volume 74.

As briefly discussed above, the expansion tank 30 includes an expansion member, such as the elastic bladder or membrane 102 shown in FIG. 2. The elastic bladder 102 can bifurcate the internal volume 74 into a first volume portion 108 on a first side 112 of elastic bladder 102, and a second volume portion 116 on a second, opposite side 120 of bladder 102. In this example, the elastic bladder 102 forms a flexible, impermeable seal between the first and second volume portions 108, 116 of the internal volume 74 of expansion tank 30. The elastic bladder 102 provides for the first internal volume portion 108 of the internal volume 74 to be part of the cooling circuit 10 and sealed from the atmosphere. As a result, the elastic bladder 102 protects the dielectric fluid 40 from exposure to air and moisture from the environment. In the Example illustrated in FIG. 2, the elastic bladder can be coupled to one of the flange members 86, 96 that together form a flange 124 of the two-piece housing 30. In this manner, the housing 30 can be easy to assemble with the elastic bladder 30 in a predetermined position. In one exemplary implementation, the elastic bladder is attached to the upper flange 86.

The inlet 50 and outlet 54 for the dielectric fluid 40 can be positioned relative to a bottom 128 of tank 30 such that the inlet and outlet 50, 54 should always be submerged in dielectric fluid 40 during operating conditions and environmental conditions of the electric vehicle. For example, the cooling circuit 10 can be developed taking into account lowering of the dielectric fluid level 40 in volume 78 due to any draw on dielectric fluid 40 from expansion tank 30 during operation of the electric vehicle, as well as any such draw during coldest operating conditions of the dielectric fluid 40, which would represent it lowest volume and lowest fluid level in the expansion tank 30. In a similar manner, the fill inlet 62 for the dielectric fluid 40 can be positioned at a height relative to the bottom 128 of the expansion tank 30 and the elastic bladder 102 such that the fill inlet 62 should be in contact with dielectric fluid 40 at its lowest operating level.

In the example expansion tank 30 illustrated in FIG. 2, the interior volume 74 includes only the first and second volume portions 108, 116. The first volume portion receives and is associated with the dielectric fluid 40 and its operation flow relative to tank 30. The second volume portion 116, separated from the first volume portion 108 by the fluid-tight expansion and contraction bladder 102, houses the atmospheric air or gas 66. In one example implementation, the atmospheric air is at atmospheric pressure at standard atmospheric temperature operating conditions, such as approximately 75 degrees F. The optional breather cap 70 can be a hydrophobic cap 70 configured to maintain pressure within the second internal volume portion 116 while allowing for breathing and/or draining of moisture or condensation that may build up in the second volume portion 116 as a result of operation or use of the cooling circuit 10. Alternatively or in addition to the optional breather cap 70, the expansion tank 30 can include an optional drain 132 positioned proximate the elastic bladder 102 for use in draining any moisture or the like that may accumulate on the bladder 102.

In terms of the flexible pressurization and accounting for expansion and contraction of dielectric fluid volume 40 during operation of the electric vehicle, the gas 66 provides a spring-like function to the expansion tank 30 because the gas 66 is compressible. The flexible elastic bladder and seal 102 provides protection of the dielectric fluid 40 from exposure to the atmospheric air gas 66. During normal operating conditions of the electric vehicle, the dielectric fluid 40 can expand or contract +/−5% relative to ambient temperature when the ambient temperature ranges from −40 degrees C. to 90 degrees C., and the flexibility of the elastic bladder/seal 102 in connection with the second volume portion 116 allows for the same.

The cooling circuit and, in particular, the expansion tank provides a less complex and less costly arrangement for effectively handling dielectric fluid operation. For example, by using the flexible elastic bladder seal, the expansion tank does not require an inert gas or a particular kind of gas in the second volume portion, which reduces cost of the colling circuit as well as manufacturing and maintenance complexities. This arrangement also eliminates a need for complex control valves for inlet and outlet such an inert gas in the second volume portion, thereby further reducing cost and complexity.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric vehicle cooling system using dielectric cooling fluid, the cooling system comprising:

a cooling circuit fluidly coupling at least a traction battery, an electric motor, a fluid pump, a heat exchange device and an expansion and contraction tank;

wherein the cooling circuit is a closed circuit sealed from the atmosphere and at least substantially free of atmospheric air;

wherein the pump circulates the dielectric fluid through the cooling circuit for cooling at least the traction battery and the electric motor;

wherein the expansion and contraction tank is configured to provide a sealed volume in the cooling circuit to allow for thermal expansion of the dielectric fluid as the temperature of the dielectric fluid increases with increasing temperature of one or more of at least the traction battery and electric motor;

wherein the expansion and contraction tank includes an expansion member bifurcating an internal volume of the expansion and contraction tank into a first portion on one side of the expansion member in communication with the dielectric fluid, and second portion on an opposite side of the expansion member, the expansion member providing a seal between the first and second portions; and wherein the second portion comprises a gas that is configured to compress within the second portion of the tank with the thermal expansion of the dielectric fluid in the first portion.

2. The electric vehicle cooling system of claim 1, wherein the expansion and contraction tank includes an outer housing forming the internal volume with the second portion being sealed from the atmosphere, and wherein the internal volume comprises only the first and second portions.

3. The electric vehicle cooling system of claim 2, wherein the gas in the second portion is substantially at atmospheric pressure when the dielectric fluid is at atmospheric temperature.

4. The electric vehicle cooling system of claim 2, wherein the gas in the second portion performs a spring function reacting against the thermal expansion of the dielectric fluid in the first portion as the temperature of the dielectric fluid increases.

5. The electric vehicle cooling system of claim 2, wherein the outer housing of the expansion tank includes a hydrophobic breather cap in fluid communication with only the second portion of the internal volume.

6. The electric vehicle cooling system of claim 2, wherein the outer housing of the expansion tank is a rigid housing.

7. The electric vehicle cooling system of claim 2, wherein the outer housing of the expansion tank is a two-piece housing having first and second housing body portions, and a flange for sealingly connecting the first and second housing body portions to form the internal volume.

8. The electric vehicle cooling system of claim 7, wherein the expansion member is coupled to the flange.

9. The electric vehicle cooling system of claim 8, wherein the expansion member comprises an elastic bladder.

10. The electric vehicle cooling system of claim 2, wherein the expansion member is configured to expand under pressure so as to provide an additional 2.0 liters of volume to the first portion of the internal volume of the tank.

11. The electric vehicle cooling system of claim 2, wherein the expansion and contraction tank is a standalone tank separate and distinct from the battery pack.

12. The electric vehicle cooling system of claim 1, wherein the expansion member comprises an elastic bladder or membrane sealing the first portion from the second portion of the expansion tank, and sealing the first portion from the atmosphere.

13. The electric vehicle cooling system of claim 1, wherein the gas is atmospheric air.

* * * * *